3,515,718
HYPOCHLORITE MODIFIED CYANOETHYLATED STARCH HAVING INTACT GRANULE FORM

Charles L. Mehltretter, 4117 Hawthorne Place 61614, and Carl A. Wilham, 1425 W. Circle Road 61604, both of Peoria, Ill.
No Drawing. Filed July 13, 1967, Ser. No. 659,269
Int. Cl. C08b 19/06; D21h 1/24
U.S. Cl. 260—233.3                    1 Claim

ABSTRACT OF THE DISCLOSURE

Cyanoethylated starch in intact granule form is oxidized with hypochlorite under mildly alkaline conditions that preserve the intact granule form and prevent internal crosslinks. The product has carboxyl, carbonyl, cyanoethyl, and carboxyethyl functionality and forms stable, high solids aqueous solutions after being pasted in hot water. The solutions are used as paper sizings.

---

This invention relates to a process for obtaining high yields of subsequently dispersible hypochlorite oxidized cyanoethylated starch ethers in unruptured whole granule form, which slightly oxidized starch ethers exhibit greatly improved swelling and complete dispersibility when heated in water compared to the nonoxidized cyanoethylated starches from which they are derived. More particularly, this invention relates to a commercially advantageous method for preparing slightly oxidized cyanoethylated starch ethers that are produced under mild, nongelatinizing conditions that hydrolyze the ester type carboxyl crosslinkages and some of the cyanoethyl groups caused by the cyanoethylation, thus providing polyfunctional starch ether end products that contain combinations of carbonyl, carboxyl, carboxyethyl, and cyanoethyl groups.

The intact granule form of the prior art cyanoethylated starch ethers are known to exhibit a considerable degree of granule inhibition as evidenced by the well recognized poor dispersibility of their heated aqueous suspensions. Such heated suspensions upon standing at room temperature tend to readily settle because the appreciably crosslinked starch ether granules are resistent to swelling under normal cooking conditions and therefore remain undispersed or only partly dispersed after heating or cooking at about 90 to 100° C.

Such granule inhibition is presumed to result from an intragranular crosslinking reaction between a small proportion of the hydroxyl and nitrile groups in the cyanoethylated starch structure which produces ester group crosslinkages. The process of our invention, however, provides a means by which granule inhibition may be reduced or prevented without destruction of the intact granule in order to obtain complete water dispersibility in the resulting products and without forfeiting the marked cost benefits that accrue from the essentially loss-free nonextractive filtration of the granules. In our process the ester crosslinks are broken under mild conditions of temperature and alkaline pH and only a part of the free cyanoethyl groups present are hydrolyzed to carboxyethyl groups as evidenced by a chemically verified loss of nitrogen. The prior art, as disclosed in Bock et al., U.S. Pat. No. 2,316,128, also shows the preparation of non-granular carboxyethyl starch ethers by reaction of starch and acrylonitrile in the presence of strong alkali, in which case, however, the intact granule form is completely destroyed and apparently no cyanoethyl groups remain unaltered. Furthermore, in our process the sodium hypochlorite oxidizes some of the primary and secondary hydroxyl groups of the starch to carboxyl and carbonyl groups. Variations in the amount of all of these groups provide a means of improving the dispersibility and colloidal properties of the products for various industrial applications.

The object of this invention is to provide a method for producing starch products of improved dispersibility and clarity in water. Another object is the production of starch derivatives possessing carbonyl, carboxyl, carboxyethyl, and cyanoethyl groups in varying amounts. Still another object of this invention is to provide a method for producing starch derivatives having unique colloidal properties. A further object of this invention is the production from intact granule cyanoethylated starches of essentially noninhibited starch derivatives which still retain their intact granule form. Other objects and advantages of this invention will be apparent from the following description.

In accordance with this invention, intact granule cyanoethylated starches are subjected to oxidation by chlorine in aqueous mildly alkaline medium. The process can be adjusted to result in the formation of varying amounts of carboxyl groups. Carbonyl groups are also produced to a small extent as indicated by reduction of hot Fehling's solution and carboxyethyl groups are also formed in limited degree by hydrolysis of cyanoethyl groups. The highly stable starch ethers produced by the method of this invention are all characterized by the fact that while still retaining an intact granule structure they nonetheless display excellent stability and very little, if any, of granule inhibition, as is evidenced by their excellent dispersibility in water, high clarity of the aqueous dispersions, and crystal clear transparency of the films prepared from the aqueous dispersions, which films can be completely redissolved in water.

The starches applicable to this invention are the common starches including the widely available corn, potato, and wheat starches.

Although we prefer to prepare our own cyanoethylated starch granules, the starch ethers from certain commercial sources could also be used.

We first form a slurry containing about 35–45% starch at temperatures substantially below the normal gelatinization range of the starch. The pH of this starch slurry is then adjusted with alkali to a value of about 10 to 12. Any alkali may be employed, but sodium hydroxide is preferred. Generally, a gelatinization inhibitor such as sodium sulfate is also added to the slurry. The starch in the alkaline slurry is then reacted with sufficient acrylonitrile at temperatures of 25–55° C. to provide whole granule starch ethers having a cyanoethyl D.S. of 0.07 to 0.1 and then with chlorine in alkaline solution or sodium hypochlorite at a temperature in the range of 35–40° C. An amount of sodium hydrochlorite, up to about 0.22 mole per mole of starch, may be reacted with the cyanoethylated starch, but preferably only 0.11–0.18 mole per mole of the cyanoethylated starch. The cyanoethylated starch may first be isolated by filtration and then oxidized with hypochlorite separately but it is more practical to carry out both reactions in succession in the same reaction vessel without such isolation.

The alkali and hypochlorite penetrate the intact etherified granule and concomitantly hydrolyze both the ester crosslinkages and a small amount of the cyanoethyl groups to carboxyethyl groups and simultaneously oxidize the primary and secondary hydroxy groups of the starch granules to carboxyl and carbonyl groups. The extent of carboxyl and carbonyl group formation is directly dependent upon the amount of hypochlorite employed. By the method of this invention we have, therefore, obtained excellent products displaying improved dispersibility and high clarity. High clarity is extremely important in starch dispersions utilized as paper coating adhesives for obtaining high brightness in the sheet.

The oxidized cyanoethylated starch product in intact granule form may be recovered in any convenient manner. For example, the reacted slurry may be neutralized to pH 5 to 7, dewatered, washed, and the granules dried.

By the method of this invention, we have produced starch ethers containing various combinations of cyanoethyl, carboxyethyl, carboxyl and carbonyl groups, these ethers exhibiting unique colloidal properties. We believe that carboxyethyl groups are formed to a small extent by hydrolysis of cyanoethyl groups because the oxidized products contain less nitrogen than the cyanoethylated starches before oxidation. Our procedure has the additional advantage that recovery of the oxidized starch ether product is facilitated by simple filtration or centrifugation means.

The effectiveness of our invention in reducing or eliminating the inhibition of cyanoethylated starches of intact granule structure is best illustrated by sedimentation tests. Inhibited starch products have limited ability to be dispersed in water and, as a consequence, even after being cooked in water, some of the product will settle out at the bottom of the container wherein the dispersion has been prepared. Increased inhibition is accompanied by increased settling of the product thus giving rise to lowered concentration and a smaller sediment volume. On the other hand, improved dispersibility of starch derivatives is accompanied by less settling and a greater sediment volume which, in the case of complete dispersibility, results in a homogeneous dispersion.

From the discussion set forth hereinabove, it can be seen that the process of the present invention can be varied to produce fully dispersible starch ethers containing carboxyethyl, carbonyl, carboxyl, and cyanoethyl groups having various degrees of substitution thereby enabling one to obtain derivatives differing considerably in properties. Simultaneous partial hydrolysis of the cyanoethyl groups and partial oxidation of the hydroxyl groups of the cyanoethylated starch by the method of this invention yields derivatives whose aqueous dispersions exhibit considerable stability and greatly improved clarity. The derivatives produced by the process of this invention in addition to being capable of further modification, can also be used as a warp size for textiles and as an adhesive in paper coating and sizing applications.

A number of benefits derive from the use of the hypochlorite oxidized cyanoethylated starches of the invention in paper coating and sizing applications. Because of the minimum amount of degration of the starch molecules during cyanoethylation and judiciously limited hypochlorite oxidation, relatively high molecular weight starch derivatives are obtained which should result in greater film strength of the coating. The carboxylic groups present in the starch derivatives as the sodium salts have a great affinity for water and produce viscous, clear and nongelling dispersions. Increased water retention due to the essentially depolymerization-free larger molecular size of the starch derivatives and the presence of carboxylic salts would be expected to reduce the penetration of the coating into the paper sheet while the freedom from any tendency to gel provide improved leveling of the coating solution at the time of application. The small amount of residual crosslinking should also improve the viscosity behavior toward the shearing forces of the coating machine.

EXAMPLE 1

(A) Cyanoethylation of corn starch.—To 420 g. (D.B.) or 2.6 moles of corn starch in 700 g. of aqueous $NaOH$—$Na_2SO_4$ mixture containing 4 g. of NaOH and 100 g. of $Na_2SO_4$ was added 11.14 g. of acrylonitrile (0.21 mole). Reaction was at 50–55° C. for 2 hours. Slurry was cooled, pH adjusted to 5.0–5.5, and product filtered. Product was washed free of $SO_4^=$ and washed with ethanol and acetone.

Air-dried product in intact granule form weighed 450 g. with a moisutre content of 5.9 percent.

Nitrogen content was 0.62 percent (D.B.); D.S., 0.07.

By using increased amounts of acrylonitrile, cyanoethylated starches of D.S. 0.2 were obtained in at least 98 percent yield.

(B) Preparation of sodium hypochlorite.—To 164 g. of 98-percent sodium hydroxide in 750 ml. of water was added 750 g. of ice. Chlorine was bubbled through this solution with cooling until 130 g. of chlorine was added.

Available chlorine was determined by diluting 1 ml. of the oxidant with 10 ml. of water. An excess of KI was added and the solution acidified with glacial acetic acid. 0.1 N $Na_2S_2O_3$ was used for titration. Typical preparations contained 0.07 to 0.08 g. of NaOCl per milliliter.

(C) Hypochlorite oxidation of cyanoethylated corn starch.—To 200 g. (D.B., 1.23 moles) of cyanoethylated corn starch in 340-ml. water was added 2 N NaOH to give a pH of 9.0–9.5. Temperature of the slurry was adjusted to 35–37° C. and dropwise addition (6 ml. per minute) of hypochlorite was started. On the basis of 0.11 mole of oxidant per mole of starch, 143 ml. of hypochlorite was used for the 1.23 moles of cyanoethylated starch. For maintaining the pH, 5 N HCl was used at the beginning of the reaction and 2 N NaOH at the completion. Time of oxidation was 4 hours. Small quantities of thiosulfate were used to destroy excess oxidant at the completion of the reaction.

The product in intact granule form was filtered and washed with water until free of Cl⁻. Final washes utilized small quantities of absolute ethanol and acetone.

The conditions and results of a number of hypochlorite oxidations of cyanoethylated corn starch of D.S. 0.07 and D.S. 0.10 are shown in Table I.

TABLE I

| Experiment No. | Moles NaOCl/ Mole starch | Loss in percent N | Moles COOH/ 100 AGU | Brookfield viscosity, cps, 20% paste (w./w.) | | Clarity, percent | |
|---|---|---|---|---|---|---|---|
| | | | | 1 hour | 24 hours | 2% | 20% |
| 1 | 0.11 | 0.12 | 3.0 | Soft gel | Soft gel | 95 | 89 |
| 2 | 0.11 | 0.10 | 2.7 | Soft gel | Soft gel | 95 | 88 |
| 3 | 0.16 | 0.09 | 3.5 | 2,200 | 4,000 | 97 | 87 |
| 4 | 0.17 | 0.08 | 3.6 | 3,000 | 3,200 | 95 | 89 |
| 5 | 0.18 | 0.10 | 4.7 | 480 | 1,040 | 99 | 82 |
| 6 | 0.18 | 0.10 | 4.7 | 1,140 | 2,000 | 99 | 94 |
| 7 | 0.19 | 0.12 | 5.2 | 420 | 480 | 97 | 90 |
| 8 | 0.22 | 0.13 | 5.2 | 400 | 440 | 95 | 85 |
| 9 | 0.22 | 0.10 | 4.9 | 375 | 495 | 98 | 90 |
| 10 | | | | Stiff gel | Stiff gel | 5 | Opaque |
| 11 | | | | Stiff gel | Stiff gel | 10 | Opaque |

In Experiments 1, 4, and 9, a cyanoethylated starch of D.S. 0.10 was oxidized. In Experiment 6, corn starch was cyanoethylated to D.S. 0.07 and hypochlorite oxidized without isolation of the cyanoethylated product. In Experiments 2, 3, 5, 7, and 8, a cyanoethylated starch of D.S. 0.07 was oxidized. In Experiments 10 and 11, the parent cyanoethylated starches of D.S. 0.10 and 0.07, respectively, were used.

As shown in Table I the parent unoxidized cyanoethylated starches in dispersion in water at 20% concentration gave very stiff, nearly opaque gels and poor clarity of 2% pastes. In contrast, the cyanoethylated starches oxidized with 0.16 to 0.22 mole of hypochlorite had good viscosity stability and high clarity for various industrial applications.

Viscosity measurements were made with a Brookfield LVF viscometer using the No. 2 and 3 spindles at 30 r.p.m. at approximately 25° C.

Clarity determinations were made on 2% and 20% dispersions at 650 mµ, using the Coleman Jr. spectrophotometer, after standing 24 hours at room temperature.

Paste titration method was used to determine the carboxyl content of the oxidized starches. The procedure is as follows:

One to two grams of oxidized starch in a 150 ml. beaker is occasionally stirred with 25 ml. of 0.1 N HCl during a 30-minute period. Filter through medium porosity fritted glass funnel. Wash with distilled water until free of $Cl^-$. Transfer to a 600-ml. beaker with 300 ml. of distilled water (free of $CO_2+NH_3$). Heat to boiling 5–7 minutes to insure gelatinization. Titrate hot paste with 0.1 N NaOH.

Sediment volume of the starch products as set forth in this example as well as for all the starch products similarly tested in subsequent examples was determined as follows:

Two percent by weight of the starch in water was cooked at 100° C. in a steam bath for 20 minutes. It was then allowed to stand in a 100-ml. graduate cylinder for 24 hours at room temperature and the sediment volume determined by reading off the level to which the swollen starch particles had settled. No sedimentation, i.e., the absence of sediment particles, indicates complete dispersibility of the products. All of the cyanoethylated hypochlorite oxidized starches had no sediment volume and were completely dispersed in water at the pH of the product of about 5.5. However, the parent cyanoethylated starches and a 0.20 D.S. product before oxidation had the sediment volumes shown in Table II.

TABLE II

| Cyanoethylated starch, D.S. | Sediment, vol. (ml.) |
|---|---|
| 0.07 | 24 |
| 0.10 | 17 |
| 0.20 | 14 |

Decreased dispersibility of the starches with increased cyanoethylation is indicated by a decrease in swelling of the granules and decreased sedimentation volume.

EXAMPLE 2

This example illustrates the cyanoethylation of corn starch followed directly by hypochlorite oxidation without isolation of the intermediate cyanoethylated starch.

364 grams (324 g., 2 moles, dry basis) of corn starch containing 11.2% moisture was slurried in 540 g. of aqueous solution containing 77 g. of sodium sulfate and 3 g. of sodium hydroxide. 8.7 g. of acrylonitrile was then added and the reaction conducted in a closed system with agitation at 25–27° C. for 22 hours. One-half of the mixture was adjusted to pH 9.5 and temperature at 35–37° C. in a beaker and dropwise addition of 117 ml. of hypochlorite solution prepared as in Example 1 took 30 minutes with control of the pH between 9.0 and 9.5. After 4 hours of reaction, a small amount of sodium thiosulfate was added to destroy excess oxidant. The product was filtered and washed with water until chloride ion free. Final washes utilized small quantities of acetone. The dry product weighed 151 g. (moisture 10.7%, 83% recovery).

The properties of the product are described under Experiment 6 in Table I of Example 1.

Four grams of clear dry film prepared by casting a 20% aqueous dispersion of the above product on a chrome plate surface and drying overnight was completely redissolved in 16 g. of water at 30–40° C.

A nonexclusive, irrevocable, royalty-free license in the invention herein described, throughout the world for all purposes of the United States Government, with the power to grant sublicenses for such purposes, is hereby granted to the Government of the United States of America.

We claim:

1. A process for improving the water dispersibility and clarity of aqueous dispersions of intact granule cyanoethylated starches, said process comprising the steps of suspending intact granules of a cyanoethylated starch having a cyanoethyl D.S. of 0.07 to 0.1 in an aqueous alkaline medium wherein the pH is adjusted to a value of 8 to 10; adding sufficient aqueous alkaline sodium hypochlorite solution to the suspension to provide 0.11 to 0.22 mole of said hypochlorite per mole of said cyanoethylated starch; reacting the resultant mixture at a pH in the range of 9.0 to 9.5 at a temperature not above 40° C. for not more than 22 hours; and recovering the resulting hypochlorite oxidized cyanoethylated starch product, said product being in intact granule form, and containing cyanoethyl ether, carboxyethyl ether, carbonyl, and carboxyl substituent groups.

References Cited

UNITED STATES PATENTS

| | | | |
|---|---|---|---|
| 2,316,128 | 4/1943 | Bock et al. | 260—233.3 |
| 2,316,129 | 4/1943 | Bock et al. | 260—233.3 |
| 2,354,838 | 8/1944 | Schopmeyer et al. | 260—233.3 |
| 2,989,521 | 6/1961 | Senti et al. | 260—233.3 |
| 3,264,283 | 8/1966 | Jarowenko | 260—233.3 |
| 3,450,692 | 6/1969 | Hyldon et al. | 260—233.3 |

FOREIGN PATENTS 808,290   2/1959   Great Britain.

DONALD E. CZAJA, Primary Examiner

R. W. GRIFFIN, Assistant Examiner

U.S. Cl. X.R.

117—156; 127—70; 252—363.5